(12) United States Patent
Otsuka et al.

(10) Patent No.: US 11,298,930 B2
(45) Date of Patent: Apr. 12, 2022

(54) METHOD OF MANUFACTURING DIMMING ELEMENT

(71) Applicant: NITTO DENKO CORPORATION, Ibaraki (JP)

(72) Inventors: Masanori Otsuka, Ibaraki (JP); Mariko Hirai, Ibaraki (JP); Hiroyuki Takemoto, Ibaraki (JP); Akihiro Shibuya, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 17/281,703

(22) PCT Filed: Sep. 18, 2019

(86) PCT No.: PCT/JP2019/036446
§ 371 (c)(1),
(2) Date: Mar. 31, 2021

(87) PCT Pub. No.: WO2020/071110
PCT Pub. Date: Apr. 9, 2020

(65) Prior Publication Data
US 2021/0394504 A1 Dec. 23, 2021

(30) Foreign Application Priority Data

Oct. 4, 2018 (JP) .............................. JP2018-188917

(51) Int. Cl.
*B32B 43/00* (2006.01)
*G02F 1/1343* (2006.01)
(Continued)

(52) U.S. Cl.
CPC ........ *B32B 43/006* (2013.01); *G02F 1/13439* (2013.01); *B32B 38/10* (2013.01);
(Continued)

(58) Field of Classification Search
CPC .. B32B 38/10; B32B 43/006; Y10T 156/1111; Y10T 156/1116;
(Continued)

(56) References Cited

U.S. PATENT DOCUMENTS 7,253,847 B2 8/2007 Yano
2005/0134750 A1 6/2005 Yano

FOREIGN PATENT DOCUMENTS

JP 2004-69978 A 3/2004
JP 2009-116190 A 5/2009
JP 2013-148687 A 8/2013

OTHER PUBLICATIONS

International Search Report dated Dec. 3, 2019, issued in counterpart International Application No. PCT/JP2019/036446 (1 page).

*Primary Examiner* — Philip C Tucker
*Assistant Examiner* — Nickolas R Harm
(74) *Attorney, Agent, or Firm* — WHDA, LLP

(57) ABSTRACT

The method of manufacturing a light control element of the present invention includes: removing, in a predetermined portion of a light control film including a first base material with a transparent electrode layer and a second base material with a transparent electrode layer arranged so that transparent electrode layers are opposed to each other, and a liquid crystal light control layer sandwiched between the base materials with transparent electrode layers, one of the base materials with transparent electrode layers; swelling the liquid crystal light control layer remaining in the predetermined portion after the removal of the one of the base materials with transparent electrode layers with an organic solvent; bonding a pressure-sensitive adhesive tape to a surface of the swollen liquid crystal light control layer; and peeling off the pressure-sensitive adhesive tape from the light control film together with the swollen liquid crystal light control layer.

6 Claims, 4 Drawing Sheets

(51) Int. Cl.
*G02F 1/1334* (2006.01)
*B32B 38/10* (2006.01)

(52) U.S. Cl.
CPC ......... *G02F 1/1334* (2013.01); *Y10S 156/924* (2013.01); *Y10S 156/937* (2013.01); *Y10T 156/1111* (2015.01); *Y10T 156/1116* (2015.01); *Y10T 156/1147* (2015.01); *Y10T 156/1168* (2015.01); *Y10T 156/1906* (2015.01); *Y10T 156/1978* (2015.01)

(58) Field of Classification Search
CPC ......... Y10T 156/1147; Y10T 156/1168; Y10T 156/1906; Y10T 156/1978
See application file for complete search history.

METHOD OF MANUFACTURING DIMMING ELEMENT

TECHNICAL FIELD

The present invention relates to a method of manufacturing a light control element.

BACKGROUND ART

A light control element utilizing the light scattering effect of a composite formed of a polymer and a liquid crystal material has hitherto been developed (for example, Patent Literature 1). Such light control element has a structure in which the liquid crystal material is phase-separated or dispersed in a polymer matrix, and hence a transmission mode for transmitting light and a scattering mode for scattering light can be controlled by matching the refractive indices of the polymer and the liquid crystal material to each other and by applying a voltage to the composite to change the alignment of the liquid crystal material. In order to achieve such driving, the light control element generally has a configuration in which a light control layer including the composite is sandwiched between base materials with transparent electrode layers, and part of each of the transparent electrode layers is exposed to function as an extraction electrode portion in order to supply a drive signal from an external circuit.

The extraction electrode portion is formed by, for example, removing one of the base materials with transparent electrode layers through half-cutting or the like to expose the transparent electrode layer of the other base material with a transparent electrode layer. At this time, the light control layer remaining on the transparent electrode layer is removed through wiping with a waste cloth.

CITATION LIST

Patent Literature

[PTL 1] JP 2013-148687 A

SUMMARY OF INVENTION

Technical Problem

However, when the light control layer is wiped off with the waste cloth, damage to the transparent electrode layer, such as peeling, may occur owing to rubbing to reduce the conductivity of the transparent electrode layer. In addition, small pieces of the removed light control layer may scatter to deteriorate a working environment.

The present invention has been made to solve the above-mentioned problems, and a primary object of the present invention is to provide a method of manufacturing a light control element by which an extraction electrode portion can be formed while no damage is done to a transparent electrode layer and no problem in a working environment is caused.

Solution to Problem

According to one embodiment of the present invention, there is provided a method of manufacturing a light control element including an extraction electrode portion. The method of manufacturing a light control element includes: removing, in a predetermined portion of a light control film including a first base material with a transparent electrode layer and a second base material with a transparent electrode layer arranged so that transparent electrode layers are opposed to each other, and a liquid crystal light control layer sandwiched between the base materials with transparent electrode layers, one of the base materials with transparent electrode layers; swelling the liquid crystal light control layer remaining in the predetermined portion after the removal of the one of the base materials with transparent electrode layers with an organic solvent; bonding a pressure-sensitive adhesive tape to a surface of the swollen liquid crystal light control layer; and peeling off the pressure-sensitive adhesive tape from the light control film together with the swollen liquid crystal light control layer.

In one embodiment, the pressure-sensitive adhesive tape includes a pressure-sensitive adhesive layer that is substantially free from being swollen with or dissolved in the organic solvent.

In one embodiment, the pressure-sensitive adhesive layer has a gel fraction of from 30% to 100%.

In one embodiment, the transparent electrode layers each contain a crystallized metal oxide.

In one embodiment, the liquid crystal light control layer has a thickness of from 2 μm to 30 μm.

In one embodiment, the predetermined portion is an extending portion extending from a main body portion of the light control film in a direction perpendicular to a thickness direction thereof, and a peeling direction of the pressure-sensitive adhesive tape is a direction substantially opposite to the extending direction of the extending portion.

Advantageous Effects of Invention

According to the present invention, the method of manufacturing a light control element by which an extraction electrode portion can be formed while no damage is done to a transparent electrode layer and no problem in a working environment is caused can be provided.

DESCRIPTION OF EMBODIMENTS

Embodiments of the present invention are described below, but the present invention is not limited to these embodiments.

A method of manufacturing a light control element including an extraction electrode portion according to one embodiment of the present invention includes: removing, in a predetermined portion of a light control film including a first base material with a transparent electrode layer and a second base material with a transparent electrode layer arranged so that transparent electrode layers are opposed to each other, and a liquid crystal light control layer sandwiched between the base materials with transparent electrode layers, one of the base materials with transparent electrode layers (removal step for a base material with a transparent electrode layer); swelling the liquid crystal light control layer remaining in the predetermined portion after the removal of the one of the base materials with transparent electrode layers with an organic solvent (swelling step for the liquid crystal light control layer); bonding a pressure-sensitive adhesive tape to the surface of the swollen liquid crystal light control layer (bonding step for the pressure-sensitive adhesive tape); and peeling off the pressure-sensitive adhesive tape from the light control film together with the swollen liquid crystal light control layer (peeling step for the pressure-sensitive adhesive tape). In the present invention, in the predetermined portion where the extraction electrode portion is formed, the liquid crystal light control layer remaining after the removal of the one of the base materials with transparent electrode layers is collectively removed together with the pressure-sensitive adhesive tape. Thus, the transparent electrode layer of the other base material with a transparent electrode layer can be exposed to serve as the extraction electrode portion without performance of wiping with a waste cloth.

The extraction electrode portion is typically arranged for each transparent electrode layer. Accordingly, the formation of the extraction electrode layer may be performed for the transparent electrode layer of each of the first and second base materials with transparent electrode layers. As used herein, a device which includes the extraction electrode portion and which is capable of being connected to an external circuit is sometimes referred to as "light control element", and a device in a state in which no extraction electrode portion is formed is sometimes referred to as "light control film". The respective steps are described in detail below with reference to FIG. 1 and FIG. 2.

A. Removal Step for Base Material with Transparent Electrode Layer

Figure 1A:
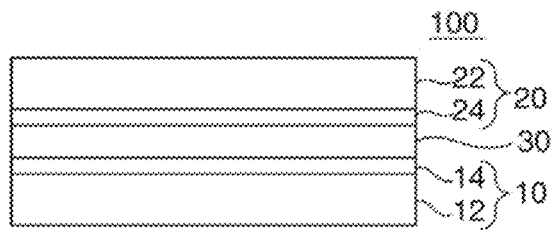
FIG. 1(a) to FIG. 1(e) are schematic views for illustrating a manufacturing method of the present invention.
Figure 1B:
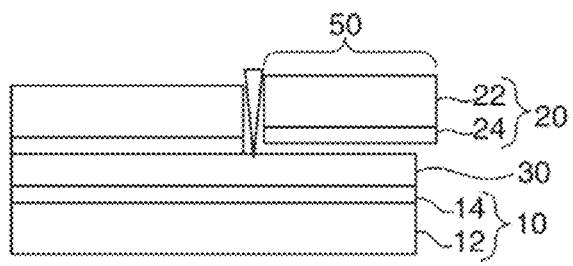

As illustrated in FIG. 1(a) and FIG. 1(b), in the removal step for the base material with a transparent electrode layer, in a predetermined portion 50 of a light control film 100 including a first base material 10 with a transparent electrode layer and a second base material 20 with a transparent electrode layer arranged so that transparent electrode layers are opposed to each other, and a liquid crystal light control layer 30 sandwiched between the base materials 10 and 20 with transparent electrode layers, one of the base materials with transparent electrode layers (in the illustrated example, the second base material 20 with a transparent electrode layer) is removed.

Figure 2A:
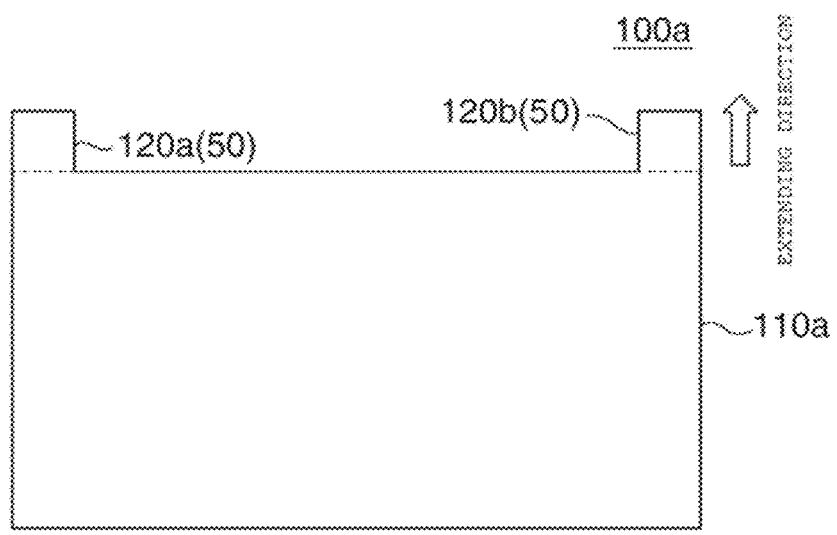
FIG. 2(a) is a schematic top view of an example of a light control film applicable to the manufacturing method of the present invention.
Figure 2B:
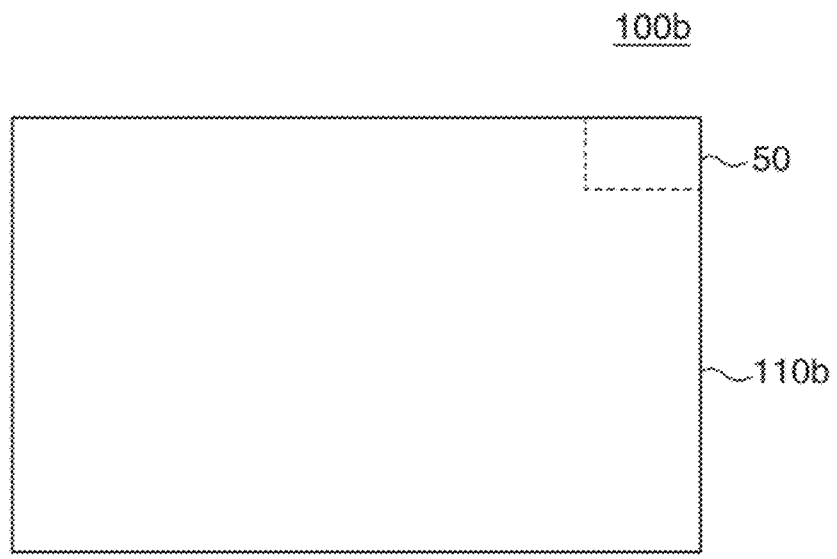
FIG. 2(b) is a schematic top view of another example of the light control film applicable to the manufacturing method of the present invention.

FIG. 2(a) and FIG. 2(b) are each a schematic top view of an example of a light control film applicable to this step. In top view, a light control film 100a illustrated in FIG. 2(a) includes: a main body portion 110a of a substantially rectangular shape configured to exhibit a light control function; and a first extending portion 120a and a second extending portion 120b of substantially rectangular shapes extending from one side thereof in one direction perpendicular to the thickness direction thereof. In this embodiment, the first and second extending portions 120a and 120b each correspond to the predetermined portion 50, and the first or second base material with a transparent electrode layer and the liquid crystal light control layer may be removed in each of the first and second extending portions to form the extraction electrode portion.

A light control film 100b illustrated in FIG. 2(b) has a substantially rectangular shape in top view, and one corner portion thereof is used as the predetermined portion 50, while the remaining portion is used as a main body portion 110b. Also on the lower surface side of the light control film 100b, another corner portion thereof that does not overlap the predetermined portion on the upper surface side thereof in plan view is used as the predetermined portion, though the portion is not shown.

A-1. First Base Material with Transparent Electrode Layer

As illustrated in FIG. 1(a), the first base material 10 with a transparent electrode layer includes a first transparent base material 12 and a first transparent electrode layer 14 arranged on one side thereof. The first base material 10 with a transparent electrode layer may include a hard coat layer on the side of the first transparent base material 12 opposite to the side thereof having arranged thereon the first transparent electrode layer 14 and/or between the first transparent base material 12 and the first transparent electrode layer 14, though the layer is not shown. In addition, an alignment film may be arranged on the surface of the transparent electrode layer in accordance with the drive mode of the light control element.

The surface resistance value of the first base material with a transparent electrode layer is preferably from $0.1\Omega/\square$ to $1,000\Omega/\square$, more preferably from $0.5\Omega/\square$ to $300\Omega/\square$, still more preferably from $1\Omega/\square$ to $200\Omega/\square$.

The haze value of the first base material with a transparent electrode layer is preferably 20% or less, more preferably 10% or less, still more preferably from 0.1% to 10%.

The total light transmittance of the first base material with a transparent electrode layer is preferably 30% or more, more preferably 60% or more, still more preferably 80% or more.

The first transparent electrode layer may be formed by using, for example, a metal oxide, such as indium tin oxide (ITO), zinc oxide (ZnO), or tin oxide ($SnO_2$). In this case, the metal oxide may be an amorphous metal oxide or a crystallized metal oxide. Although the crystallized metal oxide has a transmittance and electrical conductivity more excellent than those of the amorphous oxide, the crystallized metal oxide is liable to break, and hence its breakage or peeling is liable to occur at the time of its rubbing with a waste cloth. Accordingly, when the transparent electrode layer containing the crystallized metal oxide is used, the effects of the present invention can be more suitably obtained.

The first transparent electrode layer may also be formed of a metal nanowire, such as a silver nanowire (AgNW), a carbon nanotube (CNT), an organic conductive film, a metal layer, or a laminate thereof.

The first transparent electrode layer may be patterned into a desired shape depending on the purposes.

The first transparent electrode layer has a thickness of preferably from 0.01 μm to 0.10 μm, more preferably from 0.01 μm to 0.045 μm.

The first transparent electrode layer is arranged on one surface of the first transparent base material by, for example, sputtering. After the formation of a metal oxide layer by the sputtering, the layer can be crystallized by annealing. The annealing is performed by, for example, thermally treating the layer at from 120° C. to 300° C. for from 10 minutes to 120 minutes.

The first transparent base material may be formed by using any appropriate material. A polymer base material, such as a film or a plastic base material, is preferably used as a formation material.

The polymer base material is typically a polymer film containing a thermoplastic resin as a main component. Examples of the thermoplastic resin include: a cycloolefin-based resin, such as polynorbornene; an acrylic resin; a polyester-based resin, such as polyethylene terephthalate; a polycarbonate resin; and a cellulose-based resin. Of those, a polynorbornene resin, a polyethylene terephthalate resin, or a polycarbonate resin may be preferably used. The thermoplastic resins may be used alone or in combination thereof.

The first transparent base material has a thickness of preferably from 20 µm to 200 µm, more preferably from 30 µm to 100 µm.

A-2. Second Base Material with Transparent Electrode Layer

As illustrated in FIG. 1(a), the second base material 20 with a transparent electrode layer includes a second transparent base material 22 and a second transparent electrode layer 24 arranged on one side thereof. The second base material 20 with a transparent electrode layer may include a hard coat layer on the side of the second transparent base material 22 opposite to the side thereof having arranged thereon the second transparent electrode layer 24 and/or between the second transparent base material 22 and the second transparent electrode layer 24, though the layer is not shown. In addition, an alignment film may be arranged on the surface of the transparent electrode layer in accordance with the drive mode.

The surface resistance value of the second base material with a transparent electrode layer is preferably from 0.1Ω/□ to 1,000Ω/□, more preferably from 0.5Ω/□ to 300Ω/□, still more preferably from 1 Ω/□ to 200 Ω/□.

The haze value of the second base material with a transparent electrode layer is preferably 20% or less, more preferably 10% or less, still more preferably from 0.1% to 10%.

The total light transmittance of the second base material with a transparent electrode layer is preferably 30% or more, more preferably 60% or more, still more preferably 80% or more.

The same description as that of the first transparent electrode layer and the first transparent base material can be applied to the second transparent electrode layer and the second transparent base material, respectively. The second base material with a transparent electrode layer may have the same configuration as that of the first base material with a transparent electrode layer or may have a different configuration.

A-3. Liquid Crystal Light Control Layer

The liquid crystal light control layer 30 typically has a structure in which a liquid crystal compound is dispersed in a resin matrix. Specific examples thereof include a light control layer containing a polymer dispersed liquid crystal and a light control layer containing a polymer network liquid crystal. The polymer dispersed liquid crystal has a structure in which liquid crystals are phase-separated in a polymer. The polymer network liquid crystal has a structure in which liquid crystals are dispersed in a polymer network, and the liquid crystals in the polymer network have a continuous phase.

Any appropriate liquid crystal compound of a non-polymeric type is used as the liquid crystal compound. Examples thereof include nematic, smectic, and cholesteric liquid crystal compounds. The nematic liquid crystal compound is preferably used from the viewpoint of achieving excellent transparency in a transmission mode. Examples of the nematic liquid crystal compound include a biphenyl-based compound, a phenyl benzoate-based compound, a cyclohexylbenzene-based compound, an azoxybenzene-based compound, an azobenzene-based compound, an azomethine-based compound, a terphenyl-based compound, a biphenyl benzoate-based compound, a cyclohexylbiphenyl-based compound, a phenylpyridine-based compound, a cyclohexylpyrimidine-based compound, and a cholesterol-based compound.

The content ratio of the liquid crystal compound in the liquid crystal light control layer is, for example, 10 wt % or more, preferably 30 wt % or more, more preferably 35 wt % or more, still more preferably 40 wt % or more. The content ratio is, for example, 90 wt % or less, preferably 70 wt % or less.

A resin for forming the resin matrix may be appropriately selected in accordance with the light transmittance, the refractive index of the liquid crystal compound, and the like. Examples thereof include: a water-soluble resin or water-dispersible resin, such as a urethane-based resin, a polyvinyl alcohol-based resin, a polyethylene-based resin, a polypropylene-based resin, and an acrylic resin, and a liquid crystal polymer; and a radiation-curable resin, such as a (meth) acrylic resin, a silicone-based resin, an epoxy-based resin, a fluorine-based resin, a polyester-based resin, or a polyimide resin.

The content ratio of the matrix resin in the liquid crystal light control layer is, for example, 90 wt % or less, preferably 70 wt % or less, more preferably 65 wt % or less, still more preferably 60 wt % or less. In addition, the content ratio is, for example, 10 wt % or more, preferably 30 wt % or more.

The matrix resin is preferably cross-linked because the liquid crystal light control layer is preferably free from being dissolved in the organic solvent to be described later while being swollen therewith. Although a method for the cross-linking is not particularly limited, for example, the addition of a cross-linking agent to the matrix resin or a method including polymerizing a cross-linkable matrix resin precursor is available. The cross-linking agent to be added to the matrix resin is not particularly limited, and a heat cross-linking agent, a UV cross-linking agent, or the like is selected. The addition amount of the cross-linking agent in the matrix resin is desirably from 0.1 part by weight to 10 parts by weight with respect to 100 parts by weight of the matrix resin.

The liquid crystal light control layer has a thickness of preferably from 2 µm to 30 µm, more preferably from 3 µm to 20 µm, still more preferably from 5 µm to 15 µm.

The liquid crystal light control layer may be produced by any appropriate method. Specific examples thereof include production methods of an emulsion system and a phase separation system.

A production method for a liquid crystal light control layer of the emulsion system includes, for example, applying an emulsion application liquid containing a matrix-forming resin and a liquid crystal compound to the surface of the transparent electrode layer of the first base material with a transparent electrode layer to form an application layer, and drying the application layer to allow the matrix-forming resin to form a resin matrix. The emulsion application liquid is preferably an emulsion containing a mixed liquid of the matrix-forming resin and an application solvent in a continuous phase, and containing the liquid crystal compound in a dispersion phase. Through application and drying of the emulsified application liquid, a liquid crystal light control layer having a configuration in which the liquid crystal compound is dispersed in the resin matrix can be formed. Typically, a light control film is obtained by laminating the second base material with a transparent electrode layer on the liquid crystal light control layer.

A production method for a liquid crystal light control layer of the phase separation system includes, for example, applying an application liquid containing a radiation-curable matrix-forming resin and a liquid crystal compound to the surface of the transparent electrode layer of the first base material with a transparent electrode layer to form an application layer, laminating the second base material with a transparent electrode layer on the application layer to form a laminate, and applying a radiation to the laminate to polymerize the matrix-forming resin, thereby causing phase separation between the resin matrix and the liquid crystal compound. The application liquid is preferably in a uniform phase state. Alternatively, the following may be performed: the application liquid is loaded into a space between the first base material with a transparent electrode layer and the second base material with a transparent electrode layer laminated via a spacer, and then the phase separation is caused by the application of the radiation.

A-4. Method of Removing Base Material with Transparent Electrode Layer

Removal of the base material with a transparent electrode layer is performed by, for example, cutting the predetermined portion of the base material with a transparent electrode layer of interest with a cutter blade or through laser irradiation (so-called half-cutting) (in FIG. 1(b), the predetermined portion of the second base material with a transparent electrode layer is removed by half-cutting with a cutter blade). In addition, the removal may be performed by, for example, peeling off the predetermined portion of the base material with a transparent electrode layer from the light control film and snapping the peeled portion. The entirety or part of the liquid crystal light control layer typically remains in the predetermined portion after the removal of the base material.

B. Swelling Step for Liquid Crystal Light Control Layer

Figure 1C:
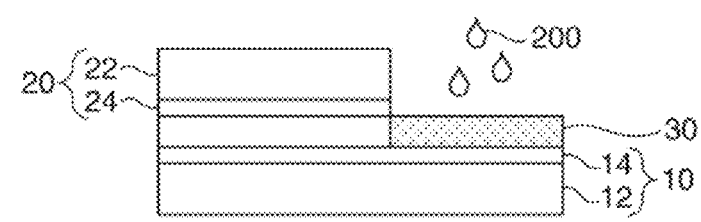

As illustrated in FIG. 1(c), in the swelling step for the liquid crystal light control layer, the liquid crystal light control layer 30 remaining in the predetermined portion after the removal of the second base material 20 with a transparent electrode layer is swollen with an organic solvent 200. When the liquid crystal light control layer 30 is swollen with the organic solvent 200, the adhesive strength of the liquid crystal light control layer 30 to the first base material 10 with a transparent electrode layer can be reduced, and hence the liquid crystal light control layer 30 can be collectively peeled off from the light control film 100 together with the pressure-sensitive adhesive tape in the peeling step for the pressure-sensitive adhesive tape to be described later.

Any appropriate organic solvent that can swell the liquid crystal light control layer may be used as the organic solvent. The organic solvent may be a solvent that dissolves part of the liquid crystal light control layer at the time of its swelling to the extent that the effects of the present invention are obtained. In addition, the organic solvent is desirably a solvent free from swelling or dissolving the first base material with a transparent electrode layer and the second base material with a transparent electrode layer. Such organic solvent may be appropriately selected in accordance with, for example, the kind and cross-linking degree of the matrix-forming resin, and formation materials for the base materials with transparent electrode layers. In one embodiment, the following organic solvent may be preferably used: when the temperature of the organic solvent is controlled to 20° C., and then the solvent is dropped onto the liquid crystal light control layer having a thickness of 20 µm and left to stand for 30 seconds, the thickness of the portion of the liquid crystal light control layer onto which the solvent has been dropped can be increased. For example, an organic solvent by which the thickness is increased by an amount of 10% or more as compared to the thickness before its dropping may be more preferably used.

Specific examples of the preferred organic solvent include: alcohols (e.g., alcohols each having 1 to 6 carbon atoms), such as ethanol, isopropyl alcohol, and methanol; ketones, such as methyl ethyl ketone, cyclohexanone, and diacetone alcohol; and liquid hydrocarbons, such as cyclohexane.

The liquid crystal light control layer is swollen by bringing the organic solvent into contact with the liquid crystal light control layer remaining in the above-mentioned predetermined portion. The liquid crystal light control layer may be swollen by, for example, dropping or applying the organic solvent onto the liquid crystal light control layer, or immersing the light control film in the organic solvent. The time period for which the organic solvent and the liquid crystal light control layer are brought into contact with each other may be set to, for example, from 1 second to 60 seconds, preferably from 5 seconds to 30 seconds.

C. Bonding Step for Pressure-Sensitive Adhesive Tape

Figure 1D:
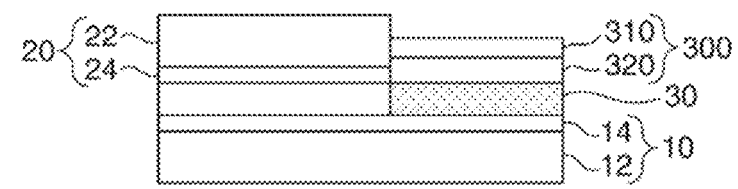

As illustrated in FIG. 1(d), in the bonding step for the pressure-sensitive adhesive tape, a pressure-sensitive adhesive tape 300 is bonded to the surface of the swollen liquid crystal light control layer 30. The pressure-sensitive adhesive tape is preferably bonded so as to cover the entirety of the predetermined portion from which one of the base materials with transparent electrode layers has been removed.

The pressure-sensitive adhesive tape 300 typically includes a base material 310 and a pressure-sensitive adhesive layer 320 arranged on one side thereof.

Examples of the base material may include plastic-based base materials, such as polyesters (e.g., polyethylene terephthalate (PET), polyethylene naphthalate, polybutylene terephthalate, and polybutylene naphthalate), polyolefins (e.g., polyethylene, polypropylene (PP), and an ethylene-propylene copolymer), polyvinyl alcohol, polyvinylidene chloride, polyvinyl chloride, a vinyl chloride-vinyl acetate copolymer, polyvinyl acetate, polyamide, polyimide, celluloses, a fluorine-based resin, polyether, polyetheramide, polyphenylene sulfide, a polystyrene-based resin (e.g., polystyrene), polycarbonate, and polyether sulfone.

The thickness of the base material is, for example, from about 10 µm to about 100 µm, preferably from about 10 µm to about 50 µm, more preferably from about 10 µm to about 30 µm.

It is preferred that the pressure-sensitive adhesive layer be substantially free from being swollen with or dissolved in the organic solvent. When the pressure-sensitive adhesive tape including such pressure-sensitive adhesive layer is used, the swollen liquid crystal light control layer and the pressure-sensitive adhesive tape can be suitably peeled off from the light control film in an integrated manner. In one embodiment, the following pressure-sensitive adhesive layer may be preferably used as the pressure-sensitive adhesive layer substantially free from being swollen with or dissolved in the organic solvent: the thickness of the pressure-sensitive adhesive layer remains substantially unchanged after the organic solvent (20° C.) has been dropped onto the surface thereof and left to stand for 30 seconds as compared to that before the dropping (e.g., the amount by which the thickness changes as compared to the thickness before the dropping is less than ±10%, preferably within ±5%).

The pressure-sensitive adhesive layer preferably has a gel fraction of from 30% to 100%, and more preferably has a gel fraction of from 50% to 90%. The gel fraction can be set within a desired range by adjusting the cross-linking degree of a pressure-sensitive adhesive (base polymer) for forming the pressure-sensitive adhesive layer.

The pressure-sensitive adhesive layer is preferably formed from a pressure-sensitive adhesive composition containing the base polymer and a cross-linking agent. The incorporation of the cross-linking agent can suitably provide a pressure-sensitive adhesive layer having a high gel fraction and free from being swollen with or dissolved in the organic solvent. The pressure-sensitive adhesive composition may further contain any appropriate additive, such as a tackifier, a plasticizer, a filler, or an antioxidant. The pressure-sensitive adhesive composition may be, for example, an acrylic pressure-sensitive adhesive composition or a rubber-based pressure-sensitive adhesive composition.

A (meth)acrylic polymer serving as the base polymer of an acrylic pressure-sensitive adhesive is preferably obtained by polymerizing monomer components including a (meth) acrylic acid ester having an alkyl group having 2 to 14 carbon atoms, and is more preferably obtained by polymerizing monomer components including, as a main monomer, the (meth)acrylic acid ester having an alkyl group having 2 to 14 carbon atoms. Herein, the ratio of the main monomer to all the monomer components for forming the (meth)acrylic polymer is preferably 60 wt % or more, more preferably 70 wt % or more. The term "(meth)acrylic acid ester" refers to an acrylic acid ester and/or a methacrylic acid ester, and has the same meaning as that of the term "(meth)" in the present invention.

Examples of the (meth)acrylic acid ester having an alkyl group having 2 to 14 carbon atoms may include ethyl (meth)acrylate, n-butyl (meth)acrylate, t-butyl (meth)acrylate, isobutyl (meth)acrylate, hexyl (meth)acrylate, 2-ethylhexyl (meth) acrylate, n-octyl (meth) acrylate, isooctyl (meth) acrylate, n-nonyl (meth) acrylate, isononyl (meth) acrylate, n-decyl (meth)acrylate, isodecyl (meth)acrylate, n-dodecyl (meth)acrylate, n-tridecyl (meth)acrylate, and n-tetradecyl (meth)acrylate. Those (meth)acrylic acid esters may be used alone or in combination thereof.

Any other polymerizable monomer except the (meth) acrylic acid ester having an alkyl group having 2 to 14 carbon atoms may be incorporated into the monomer components. Although the other polymerizable monomer is not particularly limited as long as the monomer has a polymerizable functional group based on an unsaturated double bond, such as a (meth)acryloyl group or a vinyl group, examples thereof may include a hydroxyl group-containing monomer and a carboxyl group-containing monomer.

A monomer, which has a polymerizable functional group having an unsaturated double bond, such as a (meth) acryloyl group or a vinyl group, and has a hydroxyl group, may be used as the hydroxyl group-containing monomer without any particular limitation. Examples of the hydroxyl group-containing monomer may include 2-hydroxyethyl (meth) acrylate, 3-hydroxypropyl (meth) acrylate, 4-hydroxybutyl (meth) acrylate, 6-hydroxyhexyl (meth)acrylate, 8-hydroxyoctyl (meth) acrylate, 10-hydroxydecyl (meth)acrylate, 12-hydroxylauryl (meth)acrylate, and (4-hydroxymethylcyclohexyl)methyl (meth)acrylate. Those monomers may be used alone or as a mixture thereof.

The content of the hydroxyl group-containing monomer in the monomer components is preferably 10 wt % or less, more preferably from 0 wt % to 5 wt %.

A monomer, which has a polymerizable functional group having an unsaturated double bond, such as a (meth) acryloyl group or a vinyl group, and has a carboxyl group, may be used as the carboxyl group-containing monomer without any particular limitation. Examples of the carboxyl group-containing monomer include acrylic acid, methacrylic acid, carboxyethyl (meth)acrylate, carboxypentyl (meth)acrylate, itaconic acid, maleic acid, fumaric acid, and crotonic acid. Those monomers may be used alone or in combination thereof.

The content of the carboxyl group-containing monomer in the monomer components is preferably 10 wt % or less, more preferably from 0 wt % to 5 wt %.

The other copolymerizable monomer is not particularly limited as long as the monomer has a polymerizable functional group based on an unsaturated double bond, such as a (meth)acryloyl group or a vinyl group, and examples thereof include: (meth)acrylic acid alicyclic hydrocarbon esters, such as cyclohexyl (meth)acrylate, bornyl (meth) acrylate, and isobornyl (meth)acrylate; (meth)acrylic acid aryl esters, such as phenyl (meth)acrylate; vinyl esters, such as vinyl acetate and vinyl propionate; styrene-based monomers, such as styrene; epoxy group-containing monomers, such as glycidyl (meth)acrylate and methylglycidyl (meth) acrylate; amide group-containing monomers, such as acrylamide, diethylacrylamide, acryloylmorpholine (ACMO), and N-vinylpyrrolidone (NVP); amino group-containing monomers, such as N,N-dimethylaminoethyl (meth)acrylate and N,N-dimethylaminopropyl (meth)acrylate; cyclic nitrogen-containing monomers, such as N-vinylpyrrolidone, N-vinyl-ε-caprolactam, and methylvinylpyrrolidone; alkoxy group-containing monomers, such as methoxyethyl (meth) acrylate and ethoxyethyl (meth)acrylate; cyano group-containing monomers, such as acrylonitrile and methacrylonitrile; functional monomers, such as 2-methacryloyloxyethyl isocyanate; olefin-based monomers, such as ethylene, propylene, isoprene, butadiene, and isobutylene; vinyl ether-based monomers, such as vinyl ether; halogen atom-containing monomers, such as vinyl chloride; and N-vinylcarboxylic acid amides.

In addition, examples of the copolymerizable monomer include: maleimide-based monomers, such as N-cyclohexylmaleimide, N-isopropylmaleimide, N-laurylmaleimide, and N-phenylmaleimide; itaconimide-based monomers, such as N-methylitaconimide, N-ethylitaconimide, N-butylitaconimide, N-octylitaconimide, N-2-ethylhexylitaconimide, N-cyclohexylitaconimide, and N-laurylitaconimide; succinimide-based monomers, such as N-(meth)acryloyloxymethylenesuccinimide, N-(meth)acryloyl-6-oxyhexamethylenesuccinimide, and N-(meth)acryloyl-8-oxyoctamethylenesuccinimide; and sulfonic acid group-containing monomers, such as styrenesulfonic acid, allylsulfonic acid, 2-(meth)acrylamide-2-methylpropanesulfonic acid, (meth) acrylamidopropanesulfonic acid, sulfopropyl (meth)acrylate, and (meth)acryloyloxynaphthalenesulfonic acid.

In addition, examples of the copolymerizable monomer include: glycol-based acrylic ester monomers, such as polyethylene glycol (meth)acrylate, polypropylene glycol (meth) acrylate, methoxyethylene glycol (meth)acrylate, and methoxypolypropylene glycol (meth)acrylate; and acrylic acid ester-based monomers each containing a heterocycle or a halogen atom, such as tetrahydrofurfuryl (meth)acrylate and fluorinated (meth)acrylate.

Further, a polyfunctional monomer may be used as the copolymerizable monomer. An example of the polyfunctional monomer is a compound having two or more unsaturated double bonds, such as (meth)acryloyl groups or vinyl groups. Examples thereof include: esterified products of (meth)acrylic acid and a polyhydric alcohol, for example, (mono or poly)alkylene glycol di(meth)acrylates including (mono or poly)ethylene glycol di(meth)acrylates, such as ethylene glycol di(meth)acrylate, diethylene glycol di(meth)acrylate, triethylene glycol di (meth) acrylate, trimethylolpropane tri (meth) acrylate, and tetraethylene glycol di(meth)acrylate, and (mono or poly)propylene glycol di(meth)acrylates, such as propylene glycol di(meth)acrylate, as well as neopentyl glycol di (meth)acrylate, 1,6-hexanediol di (meth) acrylate, pentaerythritol di (meth) acrylate, trimethylolpropane tri(meth)acrylate, pentaerythritol tri(meth)acrylate, and dipentaerythritol hexa(meth)acrylate; polyfunctional vinyl compounds, such as divinylbenzene; and compounds each having a reactive unsaturated double bond, such as allyl (meth)acrylate and vinyl (meth)acrylate. In addition, polyester (meth)acrylate, epoxy (meth)acrylate, urethane (meth)acrylate, or the like having two or more unsaturated double bonds as functional groups similar to those of the monomer components, such as (meth)acryloyl groups or vinyl groups, added to a skeleton, such as polyester, epoxy, or urethane, may also be used as the polyfunctional monomer.

The ratio of the copolymerizable monomer except the hydroxyl group-containing monomer and the carboxyl group-containing monomer in the monomer components is preferably 40 wt % or less, more preferably from 0 wt % to 30 wt %, still more preferably from 0 wt % to 10 wt %.

The weight-average molecular weight of the (meth)acrylic polymer is preferably 50,000 or more, more preferably within the range of from 100,000 to 3,000,000, still more preferably from 500,000 to 2,500,000, still more preferably from 1,000,000 to 2,000,000. The weight-average molecular weight refers to a value measured by gel permeation chromatography (GPC) and calculated in terms of polystyrene.

Known production methods, such as solution polymerization, bulk polymerization, emulsion polymerization, and various kinds of radical polymerization, may each be appropriately selected for the production of such (meth)acrylic polymer.

A polymerization initiator, a chain transfer agent, an emulsifying agent, or the like to be used in the radical polymerization is not particularly limited, and an appropriately selected material may be used. The weight-average molecular weight of the (meth)acrylic polymer may be controlled by the usage amounts of the polymerization initiator and the chain transfer agent, and reaction conditions, and the usage amounts are appropriately adjusted in accordance with the kinds of these materials.

Various silane coupling agents may each be added to the pressure-sensitive adhesive composition for improving its adhesiveness. An agent having any appropriate functional group may be used as the silane coupling agent. Examples of the functional group include a vinyl group, an epoxy group, an amino group, a mercapto group, a (meth)acryloxy group, an acetoacetyl group, an isocyanate group, a styryl group, and a polysulfide group. Specific examples thereof include: vinyl group-containing silane coupling agents, such as vinyltriethoxysilane, vinyltripropoxysilane, vinyltriisopropoxysilane, and vinyltributoxysilane; epoxy group-containing silane coupling agents, such as γ-glycidoxypropyltrimethoxysilane, γ-glycidoxypropyltriethoxysilane, 3-glycidoxypropylmethyldiethoxysilane, and 2-(3,4-epoxycyclohexyl)ethyltrimethoxysilane; amino group-containing silane coupling agents, such as γ-aminopropyltrimethoxysilane, N-β-(aminoethyl)-γ-aminopropylmethyldimethoxysilane, N-(2-aminoethyl) 3-aminopropylmethyldimethoxysilane, γ-triethoxysilyl-N-(1,3-dimethylbutylidene)propylamine, and N-phenyl-γ-aminopropyltrimethoxysilane; mercapto group-containing silane coupling agents, such as γ-mercaptopropylmethyldimethoxysilane; styryl group-containing silane coupling agents, such as p-styryltrimethoxysilane; (meth)acrylic group-containing silane coupling agents, such as γ-acryloxypropyltrimethoxysilane and γ-methacryloxypropyltriethoxysilane; isocyanate group-containing silane coupling agents, such as 3-isocyanatopropyltriethoxysilane; and polysulfide group-containing silane coupling agents, such as bis(triethoxysilylpropyl)tetrasulfide.

Although the silane coupling agents may be used alone or as a mixture thereof, the entire content of such agent is preferably 1 part by weight or less, more preferably from 0.01 part by weight to 1 part by weight, still more preferably from 0.02 part by weight to 0.8 part by weight with respect to 100 parts by weight of the base polymer (solid content).

When the silane coupling agent is copolymerizable with the monomer components by radical polymerization, the silane coupling agent may be used as one of the monomer components. The ratio of the agent is preferably from 0.005 part by weight to 0.7 part by weight with respect to 100 parts by weight of the base polymer (solid content).

A polyfunctional compound is used as the cross-linking agent, and examples thereof include an organic cross-linking agent and a polyfunctional metal chelate. Examples of the organic cross-linking agent include an epoxy-based cross-linking agent, an isocyanate-based cross-linking agent, a carbodiimide-based cross-linking agent, an imine-based cross-linking agent, an oxazoline-based cross-linking agent, an aziridine-based cross-linking agent, and a peroxide-based cross-linking agent. The polyfunctional metal chelate is a material in which a polyvalent metal atom is covalently bonded or coordinate-bonded to an organic compound. Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. An atom in the organic compound to which the polyvalent metal atom is covalently bonded or coordinate-bonded is, for example, an oxygen atom, and examples of the organic compound include an alkyl ester, an alcohol compound, a carboxylic acid compound, an ether compound, and a ketone compound. Those cross-linking agents may be used alone or in combination thereof. Of those, a peroxide-based cross-linking agent or an isocyanate-based cross-linking agent is preferred, and these cross-linking agents are more preferably used in combination.

The isocyanate-based cross-linking agent refers to a compound having two or more isocyanate groups (including an isocyanate reproduction-type functional group obtained by temporarily protecting an isocyanate group through an approach such as a blocking agent or oligomerization) in a molecule thereof.

Examples of the isocyanate-based cross-linking agent include: aromatic isocyanates, such as tolylene diisocyanate and xylene diisocyanate; alicyclic isocyanates, such as isophorone diisocyanate; and aliphatic isocyanates, such as hexamethylene diisocyanate.

More specific examples thereof may include: lower aliphatic polyisocyanates, such as butylene diisocyanate and hexamethylene diisocyanate; alicyclic isocyanates, such as cyclopentylene diisocyanate, cyclohexylene diisocyanate, and isophorone diisocyanate; aromatic diisocyanates, such as 2,4-tolylene diisocyanate, 4,4'-diphenylmethane diisocyanate, xylylene diisocyanate, and polymethylene polyphenyl isocyanate; isocyanate adducts, such as a trimethylolpropane/tolylene diisocyanate trimer adduct (product name: Coronate L, manufactured by Nippon Polyurethane Industry Co., Ltd.), a trimethylolpropane/hexamethylene diisocyanate trimer adduct (product name: Coronate HL, manufactured by Nippon Polyurethane Industry Co., Ltd.), and an isocyanurate form of hexamethylene diisocyanate (product name: Coronate HX, manufactured by Nippon Polyurethane Industry Co., Ltd.), a trimethylolpropane adduct of xylylene diisocyanate (product name: D110N, manufactured by Mitsui Chemicals, Inc.), and a trimethylolpropane adduct of hexamethylene diisocyanate (product name: D160N, manufactured by Mitsui Chemicals, Inc.); and polyether polyisocyanate, polyester polyisocyanate, adducts of those compounds and various polyols, and polyisocyanates multifunctionalized by, for example, an isocyanurate bond, a biuret bond, and an allophanate bond. Of those, an aliphatic isocyanate is preferably used because the reaction rate is high.

Various peroxides are used as the peroxide-based cross-linking agent. Examples of the peroxides include di(2-ethylhexyl) peroxydicarbonate, di (4-t-butylcyclohexyl) peroxydicarbonate, di-sec-butyl peroxydicarbonate, t-butyl peroxyneodecanoate, t-hexyl peroxypivalate, t-butyl peroxypivalate, dilauroyl peroxide, di-n-octanoyl peroxide, 1,1,3,3-tetramethylbutyl peroxyisobutyrate, 1,1,3,3-tetramethylbutyl peroxy-2-ethylhexanoate, di (4-methylbenzoyl) peroxide, dibenzoyl peroxide, and t-butyl peroxyisobutyrate. Of those, di (4-t-butylcyclohexyl) peroxydicarbonate, dilauroyl peroxide, and dibenzoyl peroxide, each of which is particularly excellent in cross-linking reaction efficiency, are preferably used.

Although the blending ratio of the cross-linking agent in the pressure-sensitive adhesive composition is not particularly limited, the cross-linking agent (solid content) is typically blended at a ratio of about 10 parts by weight or less with respect to 100 parts by weight of the base polymer (solid content). The blending ratio of the cross-linking agent is preferably from 0.1 part by weight to 10 parts by weight, more preferably from about 0.5 part by weight to about 5 parts by weight.

Other Examples of the acrylic pressure-sensitive adhesive composition that may be preferably used in the present invention include compositions described in JP 2001-323239 A, JP 2015-63691 A, JP 2013-54516 A, JP 2012-36402 A, JP 2012-31419 A, JP 2011-231288 A, and JP 2008-189838 A.

Examples of the base polymer of the rubber-based pressure-sensitive adhesive composition include natural rubber and various synthetic rubbers. Examples of the synthetic rubber may include a polyisoprene rubber, a styrene-butadiene (SB) rubber, a styrene-isoprene (SI) rubber, a styrene-isoprene-styrene block copolymer (SIS) rubber, a styrene-butadiene-styrene block copolymer (SBS) rubber, a styrene-ethylene-butylene-styrene block copolymer (SEBS) rubber, a styrene-ethylene-propylene-styrene block copolymer (SEPS) rubber, a styrene-ethylene-propylene block copolymer (SEP) rubber, a recycled rubber, a butyl rubber, and polyisobutylene, and modified products thereof.

The thickness of the pressure-sensitive adhesive layer is, for example, from 10 μm to 50 μm, preferably from 10 μm to 35 μm, more preferably from 15 μm to 30 μm.

The 180° peeling pressure-sensitive adhesive strength of the pressure-sensitive adhesive tape (to a polyethylene terephthalate film, peel temperature: 25° C., peel rate: 300 mm/min) is, for example, 1.5 N/10 mm or more, preferably from 2.0 N/10 mm to 15.0 N/10 mm, more preferably from 3.0 N/10 mm to 10.0 N/10 mm.

D. Peeling Step for Pressure-Sensitive Adhesive Tape

Figure 1E:
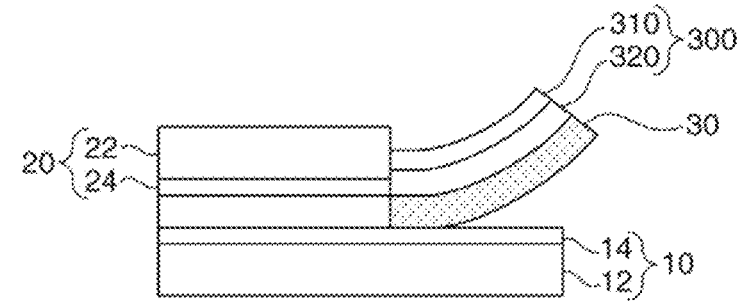

As illustrated in FIG. 1(e), in the peeling step for the pressure-sensitive adhesive tape, the pressure-sensitive adhesive tape 300 is peeled off from the light control film 100 together with the swollen liquid crystal light control layer 30. Specifically, the liquid crystal light control layer 30 reduced in adhesiveness with the first base material 10 with a transparent electrode layer by the swelling and the pressure-sensitive adhesive tape 300 are collectively peeled off from the light control film 100.

A method for the peeling is not particularly limited. The peel rate may be set to, for example, from 0.1 mm/sec to 100 mm/sec, preferably from 1 mm/sec to 50 mm/sec. In addition, the peeling may be performed under a state in which the light control film is fixed with an aspiration table, a suction table, or the like.

When the extraction electrode portion is formed in each extending portion extending from the main body portion of the light control film in the direction perpendicular to the thickness direction thereof, the peeling direction of the pressure-sensitive adhesive tape is preferably a direction substantially opposite (at an angle of 180°±20°, preferably 180°±10°) to the extending direction of the extending portion. When the pressure-sensitive adhesive tape is peeled off in the direction, the liquid crystal light control layer can be easily peeled off and removed while a load to the base material with a transparent electrode layer is suppressed.

As described above, in the light control element, the extraction electrode portion is typically formed for each transparent electrode layer. Accordingly, a light control element in which the extraction electrode portion is formed for each transparent electrode layer may be obtained by: performing the above-mentioned respective steps in the predetermined portion on one surface side of the light control film to remove one of the base materials with transparent electrode layers and the liquid crystal light control layer; and then performing the above-mentioned respective steps in the predetermined portion on the other surface side thereof to remove the other base material with a transparent electrode layer and the liquid crystal light control layer. In addition, the manufacturing method of the present invention may further include subjecting the exposed transparent electrode layer to finish wiping with a waste cloth after the collective removal of the liquid crystal light control layer with the pressure-sensitive adhesive tape as required.

EXAMPLES

Now, the present invention is specifically described by way of Example. However, the present invention is by no means limited to Example. Measurement methods for characteristics are as described below. In addition, in Example and Comparative Example, "part(s)" and "%" are by weight unless otherwise specified.

<Gel Fraction>

About 0.2 g of a pressure-sensitive adhesive layer was collected from a pressure-sensitive adhesive tape, and was wrapped with a porous tetrafluoroethylene sheet having an average pore diameter of 0.2 μm (manufactured by Nitto Denko Corporation, product name: "NTF 1122"), followed by tying with a kite string. The weight of the tied product was measured (Z g), and the weight was defined as a weight before immersion. The weight before immersion is the total weight of the pressure-sensitive adhesive layer (pressure-sensitive adhesive layer collected in the foregoing), the tetrafluoroethylene sheet, and the kite string. In addition, the total weight of the tetrafluoroethylene sheet and the kite string was measured (Y g). Next, the product obtained by wrapping the pressure-sensitive adhesive layer with the tetrafluoroethylene sheet and tying the resultant with the kite string (referred to as "sample") was loaded into a 50-milliliter vessel filled with ethyl acetate, and was left at rest at 23° C. for 7 days. After that, the sample (after the ethyl acetate treatment) was removed from the vessel, and was transferred to an aluminum cup, followed by drying at 130° C. for 2 hours in a drying machine to remove ethyl acetate. After that, the weight of the remainder was measured (X g), and the weight was defined as a weight after immersion. The gel fraction of the pressure-sensitive adhesive layer was calculated from the following equation.

$$\text{Gel fraction (wt \%)} = (X-Y)/(Z-Y) \times 100$$

Example 1

1. Removal Step for Base Material with Transparent Electrode Layer
(Production of First and Second Base Materials with Transparent Electrode Layers)

A transparent electrode layer (ITO layer) was formed on one surface of a cycloolefin-based transparent base material (norbornene-based resin film (manufactured by Zeon Corporation, product name: "ZF-16", thickness: 40 μm, Re[590]: 5 nm)) by a sputtering method, and was annealed at 140° C. for 1 hr to form an ITO crystal film (transparent electrode layer) having a surface resistance value of 100Ω/□. Thus, first and second base materials with transparent electrode layers each having the configuration [cycloolefin-based transparent base material/transparent electrode layer] were obtained.

(Production of Liquid Crystal Compound)

Compounds having the following compositions were mixed at 150° C. for 20 minutes, and were then slowly cooled to room temperature to obtain a liquid crystal compound (1) having Ln of 0.12, a viscosity of 21 cP, Ac of 10.1, and a liquid crystal temperature of from 3° C. to 52° C.

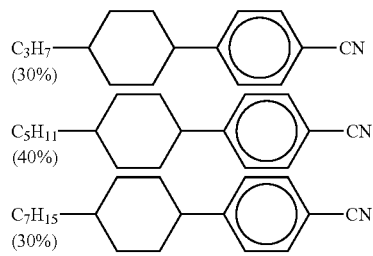

(Production of Liquid Crystal Light Control Layer)

50 Parts of the liquid crystal compound (1) was added to 50 parts (solid content) of a urethane emulsion solution (manufactured by Kusumoto Chemicals, Ltd., product name: "NeoRez R967"), followed by stirring with a homogenizer, to thereby obtain an emulsion application liquid containing liquid droplets (average particle diameter: 5 μm) of the liquid crystal compound. The emulsion application liquid was applied to the surface of the first base material with a transparent electrode layer on the transparent electrode layer side, followed by drying, to thereby form a liquid crystal light control layer having a thickness of 10 μm.

(Production of Light Control Film)

Figure 3:
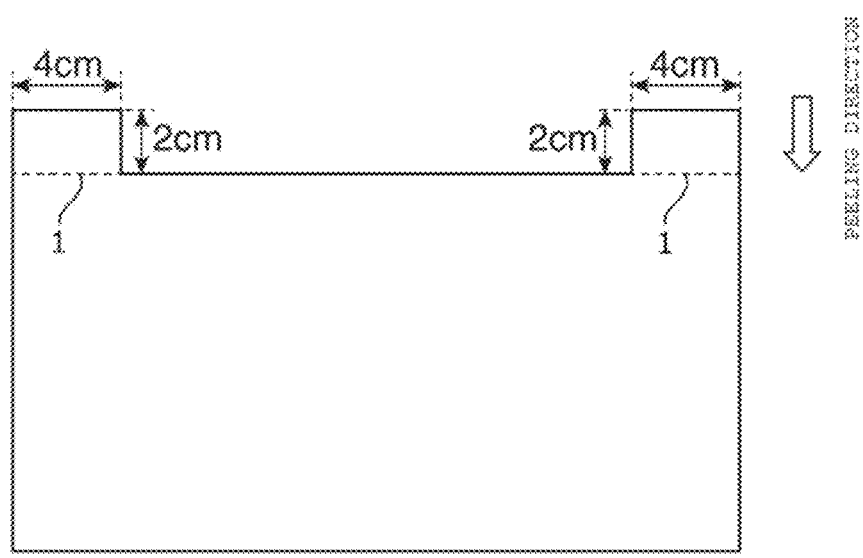
FIG. 3 is a schematic top view of a light control film applied in Example and Comparative Example.

The second base material with a transparent electrode layer was laminated on the liquid crystal light control layer so that the transparent electrode layer was opposed to the liquid crystal light control layer, to thereby obtain a light control film. Then, the obtained light control film was punched out with a Thomson blade to obtain a light control film having two extending portions (40 mm by 20 mm) as illustrated in FIG. 3.

(Removal of Second Base Material with Transparent Electrode Layer)

Only the base material with a transparent electrode layer on the upper surface of the light control film (second base material with a transparent electrode layer) was cut with a half cutter along the base (broken line 1) of one extending portion, and then the cut second base material with a transparent electrode layer was peeled off and removed. The liquid crystal light control layer remained on the outermost surface of the extending portion after the peeling.

2. Swelling Step for Liquid Crystal Light Control Layer

A swab impregnated with anhydrous ethanol was brought into contact with the surface of the liquid crystal light control layer remaining in the extending portion to cause a sufficient amount of anhydrous ethanol to adhere to the surface of the liquid crystal light control layer. 10 Seconds after the adhesion of anhydrous ethanol, the liquid crystal light control layer absorbed anhydrous ethanol to swell.

3. Bonding Step for Pressure-Sensitive Adhesive Tape

A pressure-sensitive adhesive tape having a size measuring 50 mm by 30 mm (thickness of its pressure-sensitive adhesive layer: 23 μm, gel fraction of the pressure-sensitive adhesive layer: 80%), which had been produced by the following method, was bonded to the swollen liquid crystal light control layer. At this time, the pressure-sensitive adhesive tape was bonded so that one long side thereof followed the base (broken line 1) of the extending portion and the other three sides thereof protruded toward the outside of the extending portion. Thus, the entirety of the extending portion was covered with the pressure-sensitive adhesive tape. The pressure-sensitive adhesive layer did not show a swelling property with or solubility in anhydrous ethanol. In addition, the 180° peeling pressure-sensitive adhesive strength of the pressure-sensitive adhesive tape (to a polyethylene terephthalate film, peel temperature: 25° C., peel rate: 300 mm/min) was 6 N/10 mm.

(Production of Pressure-Sensitive Adhesive Tape)
<Preparation of (Meth)Acrylic Polymer>

A monomer mixture containing 94 parts of butyl acrylate, 1 part of 2-hydroxyethyl acrylate, and 5 parts of acrylic acid was loaded into a reaction vessel including a condenser, a nitrogen-introducing tube, a temperature gauge, and a stirring apparatus. Further, 0.1 part of 2,2'-azobisisobutyronitrile was loaded as a polymerization initiator into 100 parts of the monomer mixture together with 100 parts of ethyl acetate, and a nitrogen gas was introduced to purge the flask with nitrogen while the mixture was gently stirred. After that, a liquid temperature in the flask was kept at around 55° C., and a polymerization reaction was performed for 8 hours to prepare a solution (solid content concentration: 30 wt %) of an acrylic polymer having a weight-average molecular weight (Mw) of 1,800,000 and a polydispersity Mw/Mn of 4.1.

<Preparation of Pressure-Sensitive Adhesive Composition>

100 Parts of the solid content of the acrylic polymer solution produced in the foregoing was blended with 0.3 part of benzoyl peroxide (manufactured by Nippon Oil & Fats Co., Ltd., product name: "NYPER BMT") and 1 part of an isocyanate-based cross-linking agent (manufactured by Tosoh Corporation, product name: "CORONATE L") to provide a pressure-sensitive adhesive composition.

<Preparation of Pressure-Sensitive Adhesive Layer>

The pressure-sensitive adhesive composition was applied onto a PET film (manufactured by Toyobo Co., Ltd., product name: "COSMOSHINE A4300", thickness: 38 µm), and was dried at 140° C. for 2 minutes to obtain a film with a pressure-sensitive adhesive layer having a thickness of 23 µm. Further, the film with a pressure-sensitive adhesive layer was cut into a size measuring 50 mm by 30 mm to produce a pressure-sensitive adhesive tape.

4. Peeling Step for Pressure-Sensitive Adhesive Tape

Figure 4A:
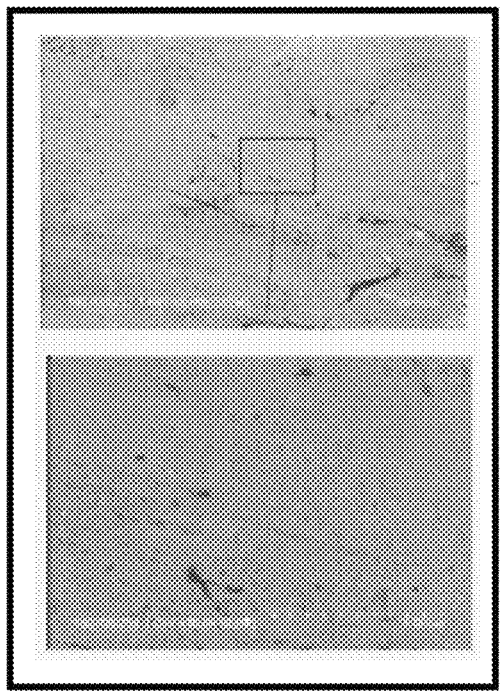
FIG. 4(a) is a SEM photograph of an extraction electrode portion formed in Example 1.

10 Seconds after the bonding, the pressure-sensitive adhesive tape was peeled off at a rate of 10 mm/sec in a direction opposite to the extending direction of the extending portion at a peel angle of 180°. As a result, the entirety of the swollen liquid crystal light control layer was transferred to the tape side, and hence the transparent electrode layer of the first base material with a transparent electrode layer was exposed. Thus, an extraction electrode portion was formed. An image obtained by observing the formed extraction electrode portion with a scanning electron microscope (SEM) is shown in FIG. 4(a).

A total of 10 such light control films were subjected to the same treatment as that described above. As a result, in each of the 10 films, the entirety of the swollen liquid crystal light control layer was transferred to the tape side, and no abrasion flaw was found in the exposed transparent electrode layer of the first base material with a transparent electrode layer. In addition, the entirety of the removed liquid crystal light control layer adhered to the pressure-sensitive adhesive surface of the pressure-sensitive adhesive tape, and no fine foreign matter due to the scattering of the removed liquid crystal light control layer adhered to the surface of each of the 10 light control films.

Comparative Example 1

Figure 4B:
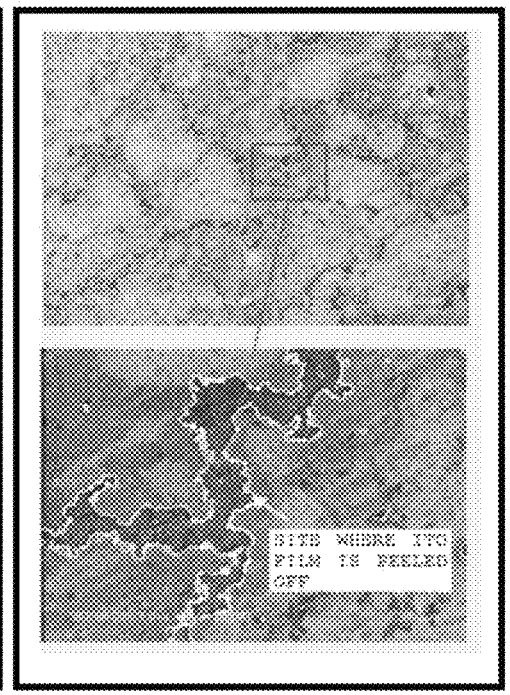
FIG. 4(b) is a SEM photograph of an extraction electrode portion formed in Comparative Example 1.

Such a light control film including two extending portions as illustrated in FIG. 3 was obtained in the same manner as in Example 1. Only the base material with a transparent electrode layer on the upper surface of the light control film (second base material with a transparent electrode layer) was cut with a half cutter along the base (broken line 1) of one extending portion, and then the cut second base material with a transparent electrode layer was peeled off and removed. The liquid crystal light control layer remained on the outermost surface of the extending portion after the peeling. A waste cloth impregnated with anhydrous ethanol was brought into contact with the surface of the liquid crystal light control layer, and was reciprocated from side to side to rub the liquid crystal light control layer until the transparent electrode layer of the first base material with a transparent electrode layer was exposed. Thus, an extraction electrode portion was formed. An image obtained by observing the formed extraction electrode portion with a scanning electron microscope (SEM) is shown in FIG. 4(b).

A total of 10 such light control films were subjected to the same treatment as that described above. As a result, in each of three of the light control films, an abrasion flaw was found in the exposed transparent electrode layer of the first base material with a transparent electrode layer. The surface resistance of the transparent electrode layer at a position having the abrasion flaw was measured with a non-contact type resistance-measuring machine (manufactured by Napson Corporation, product name: "EC-80"). As a result, the resistance was twice or more and 100 times or less as large as the original resistance value.

In addition, a small bulk of the liquid crystal light control layer scattered by the removal adhered as fine foreign matter having a diameter of from 100 µm to 500 µm to the surface of each of five of the 10 light control films.

INDUSTRIAL APPLICABILITY

The manufacturing method of the present invention is suitable for manufacturing a light control element including a liquid crystal light control layer.

REFERENCE SIGNS LIST 10 first base material with a transparent electrode layer
12 first transparent base material
14 first transparent electrode layer
20 second base material with a transparent electrode layer
22 second transparent base material
24 second transparent electrode layer
30 liquid crystal light control layer
100 light control film
300 pressure-sensitive adhesive tape

The invention claimed is:

1. A method of manufacturing a light control element including an extraction electrode portion, comprising:
removing, in a predetermined portion of a light control film including a first base material with a transparent electrode layer and a second base material with a transparent electrode layer arranged so that transparent electrode layers are opposed to each other, and a liquid crystal light control layer sandwiched between the base materials with transparent electrode layers, one of the base materials with transparent electrode layers;
swelling the liquid crystal light control layer remaining in the predetermined portion after the removal of the one of the base materials with transparent electrode layers with an organic solvent;
bonding a pressure-sensitive adhesive tape to a surface of the swollen liquid crystal light control layer; and
peeling off the pressure-sensitive adhesive tape from the light control film together with the swollen liquid crystal light control layer.

2. The method according to claim 1, wherein the pressure-sensitive adhesive tape includes a pressure-sensitive adhesive layer that is substantially free from being swollen with or dissolved in the organic solvent.

3. The method according to claim 2, wherein the pressure-sensitive adhesive layer has a gel fraction of from 30% to 100%.

4. The method according to claim 1, wherein the transparent electrode layers each contain a crystallized metal oxide.

5. The method according to claim 1, wherein the liquid crystal light control layer has a thickness of from 2 µm to 30 µm.

6. The method according to claim 1,
wherein the predetermined portion is an extending portion extending from a main body portion of the light control film in a direction perpendicular to a thickness direction thereof, and wherein a peeling direction of the pressure-sensitive adhesive tape is a direction substantially opposite to the extending direction of the extending portion.

\* \* \* \* \*